Oct. 10, 1961   F. E. OBERMAIER   3,003,320
VACUUM REGULATOR AND CONTROL SYSTEM
Filed Dec. 17, 1957   4 Sheets-Sheet 1
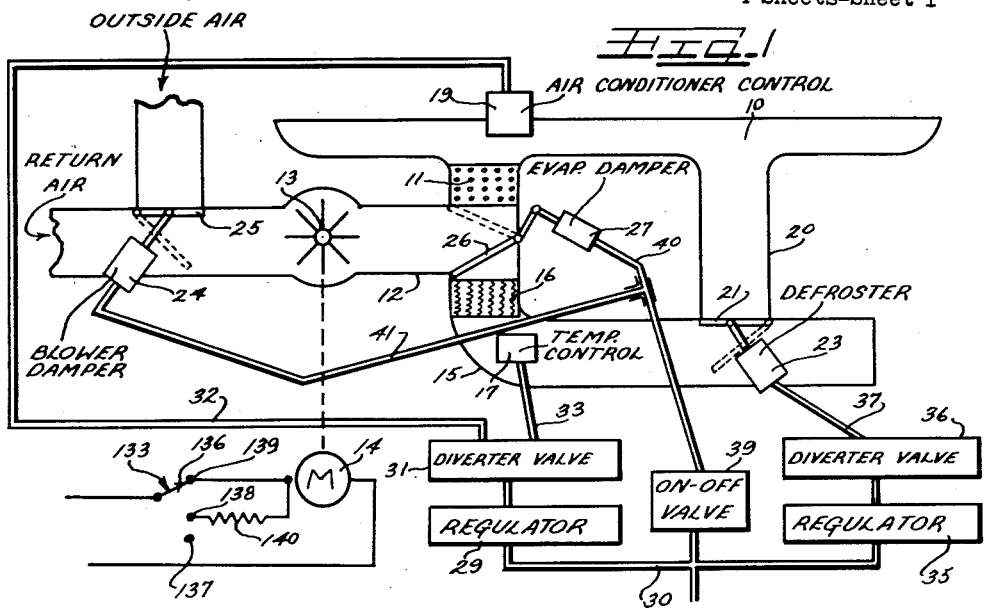
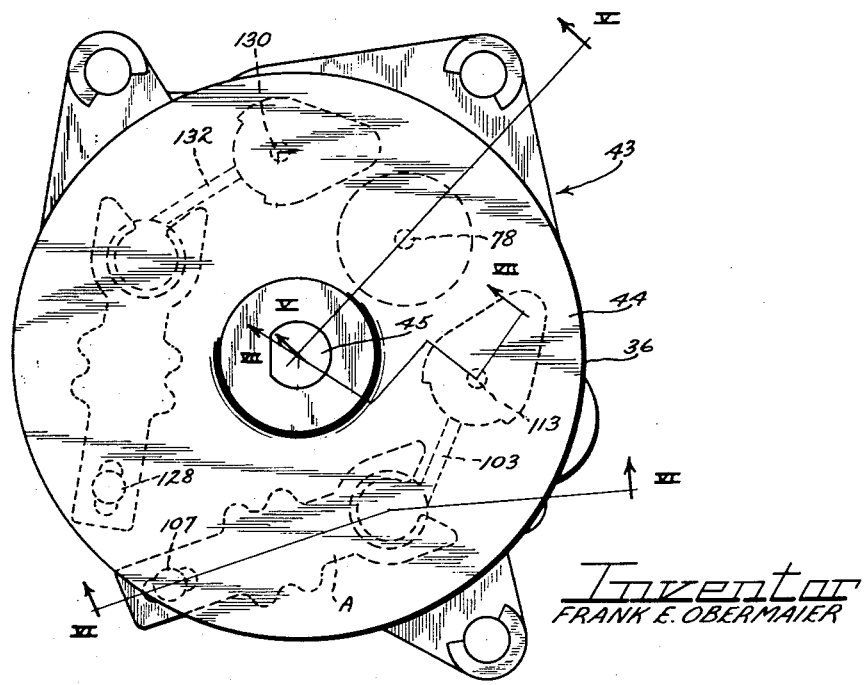
Inventor
FRANK E. OBERMAIER

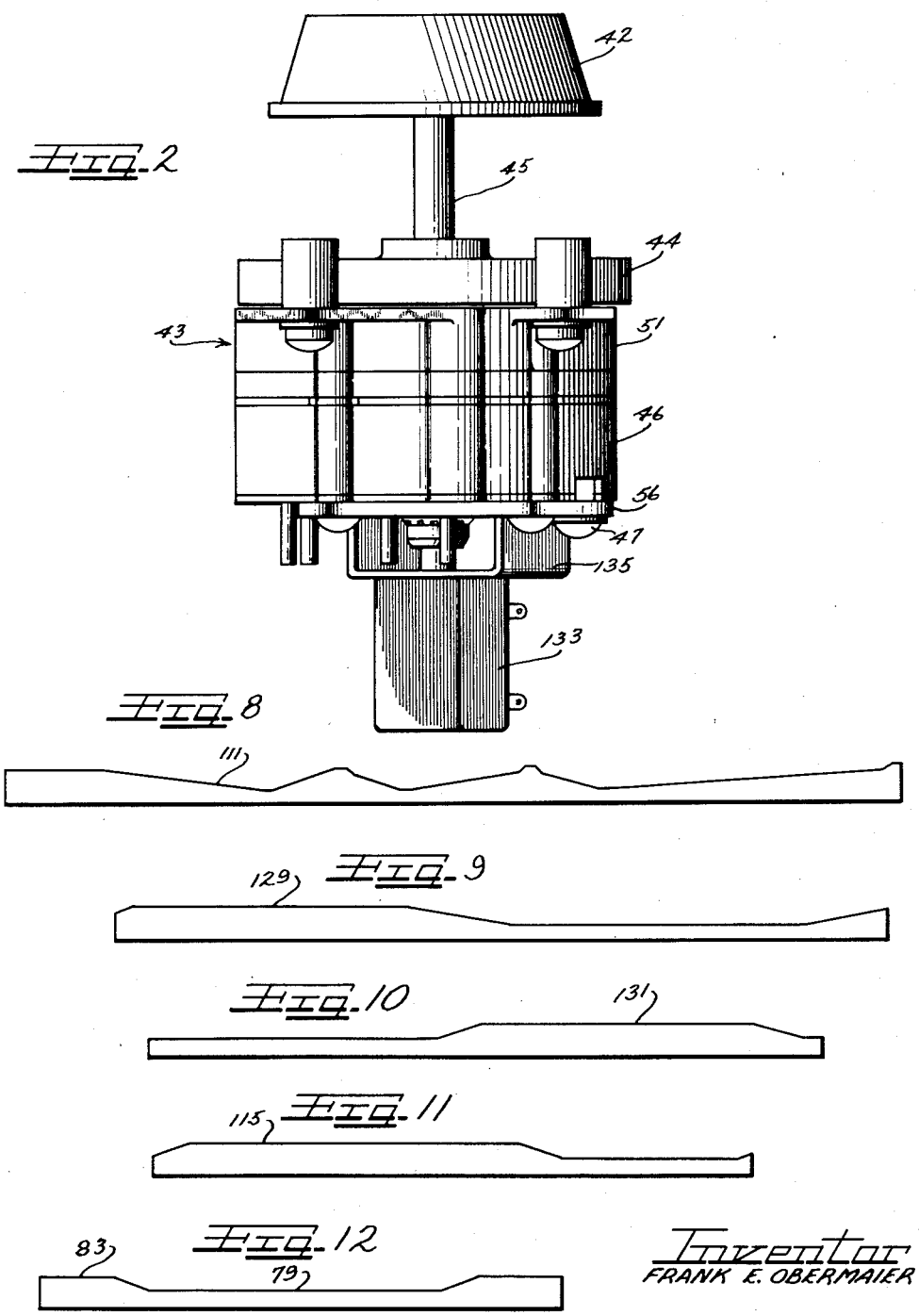

Oct. 10, 1961   F. E. OBERMAIER   3,003,320
VACUUM REGULATOR AND CONTROL SYSTEM
Filed Dec. 17, 1957   4 Sheets-Sheet 4

Inventor
FRANK E. OBERMAIER

United States Patent Office 3,003,320
Patented Oct. 10, 1961

3,003,320
VACUUM REGULATOR AND CONTROL SYSTEM
Frank Edward Obermaier, Oak Park, Ill., assignor to The Dole Valve Company, Morton Grove, Ill., a corporation of Illinois
Filed Dec. 17, 1957, Ser. No. 703,408
8 Claims. (Cl. 60—60)

This invention relates to vacuum control devices and more particularly relates to a vacuum control device controlling the heating and cooling of an automotive vehicle.

A principal object of the invention is to provide a control system controlling the heating and cooling of an automotive vehicle, eliminating the Bowden wires heretofore used for this purpose, and controlling the cooling and ventilating operations by operation of a single knob.

Another object of the invention is to provide a single knob control vacuum control device controlling the operation of an air conditioner and heater for an automotive vehicle, in which the air conditioning and heating operations are controlled independently of each other.

A still further object of the invention is to provide an efficient form of vacuum control device supplying vacuum to individual vacuum motors controlling the dampers of an automotive heating and ventilating system and the air conditioning and heating of the car, in which a novel arrangement of vacuum regulator and diverter valves is provided to effect a series of individual control operations of the respective vacuum motors independently of each other all by the operation of a single knob, which also serves to vary the temperature of heated air supplied to the passenger compartment of the automotive vehicle.

A still further object of the invention is to provide a novel and improved form of vacuum control valve utilizing diverter valves controlling the vacuum and operation of individual fluid motors, in which vacuum regulator valves regulate the vacuum at each diverter valve and the vacuum at the vacuum motors, all by operation of a single dial knob.

These and other objects of the invention will appear from time to time as the following specification proceeds and with reference to the accompanying drawings wherein:

FIGURE 1 is a diagrammatic view diagrammatically illustrating a control system for the heater and air conditioner of an automotive vehicle in which the heating, cooling, ventilating and defrosting operations are controlled in accordance with the principles of the present invention;

FIGURE 2 is a view in side elevation of a vacuum control distributor valve constructed in accordance with the invention;

FIGURE 3 is a plan view of the distributor valve shown in FIGURE 2;

FIGURES 8, 9, 10, 11 and 12 are profile views of the control cams for independently operating the various valves.

Figure 4:
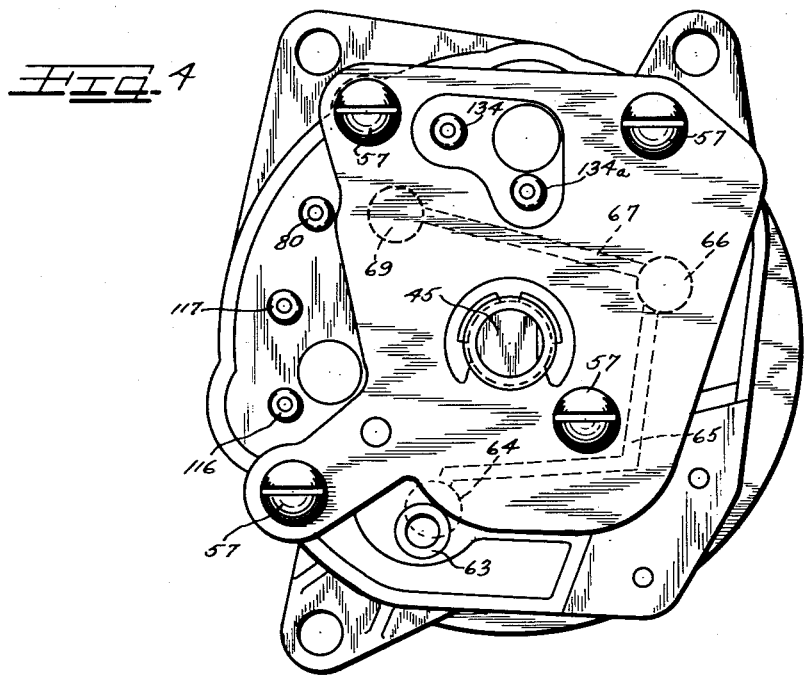
FIGURE 4 is a bottom plan view of the valve shown in FIGURE 2 with the control switch for the blower removed.

In the embodiment of the invention illustrated in the drawings, I have diagrammatically shown in FIGURE 1 an illustrative form of heating and air conditioning system for an automotive vehicle, controlled in accordance with the principles of the present invention. The heating and air conditioning system shown includes a duct 10 having communication with the passenger compartment of the automotive vehicle through the usual slots (not shown) behind the windshield for supplying cool air in the passenger compartment of the automotive vehicle along the windshield. The duct 10 is shown as having an evaporator 11 of an air conditioner having communication therewith and communicating with an air circulating duct 12 having a blower 13 therein operated by an electric motor 14.

A heater duct 15 is shown as leading from the air circulating duct 12 and as having a heater coil 16 therein supplied with hot water from the cooling system of the automotive vehicle under the control of a temperature control vacuum motor 17 controlling the flow of hot water through the heater coil 16 as shown and described in my companion application Serial No. 703,355 filed herewith, so not shown and described in detail herein. The compressor (not shown) of the air conditioner is likewise controlled by a vacuum motor 19 which may operate a compressor clutch or the like to operatively connect the compressor to be driven from the engine of the automotive vehicle in a manner well known to those skilled in the art, so not herein shown or described.

The heater duct 15 is shown as having connection with the duct 10 through a defroster duct 20 under the control of a defroster damper 21 operated by a vacuum motor 23. A vacuum motor 24 also serves to operate a damper 25 controlling the admission of outside air to the air circulating duct 12.

A damper 26 operated by a vacuum motor 27 is provided to control the flow of air either through the evaporator 11 or the heater core 16 depending upon whether it is desired to heat or cool the car.

The vacuum motors 17, 19, 23, 24 and 27, diagrammatically shown in FIGURE 1, are conventional forms of vacuum motors, in which vacuum moves a diaphragm or piston (not shown) against a spring (not shown) to effect the operation of an associated device to be operated in a well known manner, and may be of various well known forms, so need not herein be shown or described further.

I have further shown a vacuum regulator or modulator valve 29 connected with a vacuum input line 30 and having a diverter valve 31 connected in series therewith on the output side thereof having connection with the respective vacuum motors 19 and 17 through vacuum lines 32 and 33, to control the temperature of the passenger compartment of the automotive vehicle and to control the air conditioner independently of the heater control temperatures, as will hereinafter more clearly appear as this specification proceeds.

I have also shown a vacuum regulator or modulator valve 35 connected with the input vacuum line 30 and having a diverter valve 36 connected in series therewith on the vacuum output side thereof and connected with the vacuum motor 23 through a vacuum line 37.

I have also shown an on-off valve 39 connected with the evaporator damper vacuum motor 27 through a vacuum line 40 and connected with the blower damper motor 24 through a vacuum line 41 leading from the vacuum line 40.

The regulator valves 29, 35, the diverter valves 31, 36 and the on-off valve 39 are all part of a vacuum distributor and control valve 33, operated by a single disk or cam plate 44 rotatably moved by a central shaft 45 having a single knob 42 thereon, controlling operation of said valves as well as the energization and deenergization of the motor 14, as will hereinafter be more clearly described.

Referring now in particular to the vacuum distributor and control valve 43, said valve is shown as including a lower body part 46 recessed to receive an intermediate body part 47 and having a central upstanding hub 49 forming a mounting for a sleeve 50 having the cam plate or disk 44 mounted on the upper end thereof and having the shaft 45 extending therethrough for rotatably driving the cam disk 44. The valve 43 also includes an upper body part 51 closing the lower body part and extending about the intermediate body part 47 and having a plurality of detent sockets 53 therein receiving a spring biased detent ball 54 engageable with a detent recess 55 on the undersurface of the cam disk 44, to index the various operative positions of the valve.

An end closure plate 56 extends along a portion of the bottom of the lower body part 46 and is secured to said lower body part as by machine screws 57 threaded within the upper body part 51 and securing said body parts together in sealed relation with respect to each other. A spring washer 59 extending within a recessed portion 60 of the sleeve 50 and engaging the undersurface of the end plate 56 is provided to retain the sleeve 50 to the hub 49. It should here be noted that the inner face of the hub 49 is tapered and that the sleeve has an enlarged diameter portion 61 engaging the taper of said sleeve, to retain said sleeve from inward movement axially along said hub when the spring washer 59 is in position on the sleeve 50, but accommodating rotation of said sleeve with respect to said hub.

The lower body part 46 has a vacuum input 63 leading thereinto from the bottom thereof and adapted to be connected with the intake manifold of an internal combustion engine (not shown). The vacuum input 63 has direct connection with an input valve chamber 64 for the valve 29. A vacuum line 65 extending along the lower body part 46 connects the vacuum input chamber 64 with an input chamber 66 for the valve 35. A vacuum line 67 connects the vacuum input chamber 66 with a vacuum input chamber 69 for the on-off valve 39.

The vacuum input chamber 69 for the on-off valve 39 has communication with the vacuum chamber 70 for the valve through a check valve 71. The check valve 71 is a resilient check valve like that shown in my companion application Serial No. 703,355, filed herewith so need not herein be shown or described further and prevents the flow of air into the vacuum input chamber 69.

Figure 5:
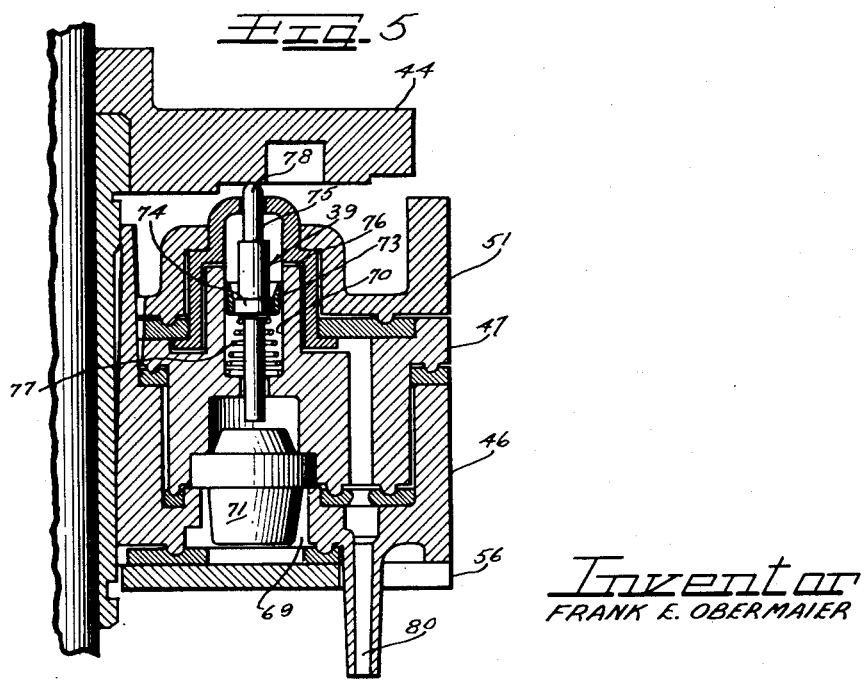
FIGURE 5 is a fragmentary sectional view taken substantially along line V—V of FIGURE 3 and illustrating the on and off valve controlling the air conditioning and heater dampers.

The on and off valve 39 includes a sleeve-like flexible annular valve 73 mounted on an enlarged diameter portion 74 of a valve stem 75, and extending from said enlarged diameter portion toward a vacuum passageway 76, and flared outwardly as it extends toward said passageway to have wiping engagement with the wall of the vacuum chamber 70. A spring 77 seated in the valve chamber 70 biases an outer or follower end 78 of the stem 75 into engagement with the undersurface of the cam disk 44. As the cam disk 44 is turned to an on position, indicated by reference character 79 on the cam profile shown in FIGURE 13, the spring 77 will move the valve 76 in position to accommodate air to be drawn through a vacuum output 80 and passageway 76 communicating with the valve chamber 70. This will operate the vacuum motors 24 and 27 at manifold vacuum and close the air conditioner damper 26 and open the outside damper 25, to accommodate fresh or heated air to be circulated through the passenger compartment either by operation of the blower 13 or by the forcing of air into the air duct 12 by the air velocity created by travel of the car. As the cam disk 44 is turned to engage the end of the stem 75 with a high part 83 of the cam on the undersurface of the cam disk 44 the valve 76 will be moved to the off position shown in FIGURE 5 accommodating air at atmospheric pressure to pass into the upper part of the chamber 70 and the vacuum output 80 and accommodating the vacuum motors 24 and 27 to move to their biased outwardly extended positions shown in FIGURE 1, with the dampers 25 and 26 connected to effect the recirculation of cooled air through the evaporator 11 as the air conditioner control is turned on by operation of the vacuum motor 19.

The vacuum regulator valves 29 and 35 are each of a similar construction so the same part numbers will be applied to each valve and only one valve need herein be shown and described in detail.

The vacuum regulator or modulator valve 29 is somewhat similar to that shown and described in my companion application Serial No. 703,355, filed herewith and includes a diaphragm 85 extending across the upper end of a vacuum control chamber 86 and having an annular rib 87 recessed within an annular recess 88 extending about the vacuum control chamber 86 and sealed thereto by engagement of the upper body part 51 therewith. The valve 29 also includes a check valve 89 having a central passageway 90 leading therethrough and affording communication between the vacuum input chamber 64 and the vacuum control chamber 88. The check valve 89 is like the check valve 71 so need not herein be shown or described further except to set forth that the walls of the lower portion of the check valve defining the passageway 90 will spread apart to accommodate the passage of air through the passageway 90 from the vacuum control chamber 86 when the vacuum in the vacuum input chamber 64 is greater than the vacuum in the vacuum control chamber 86.

Figure 6:
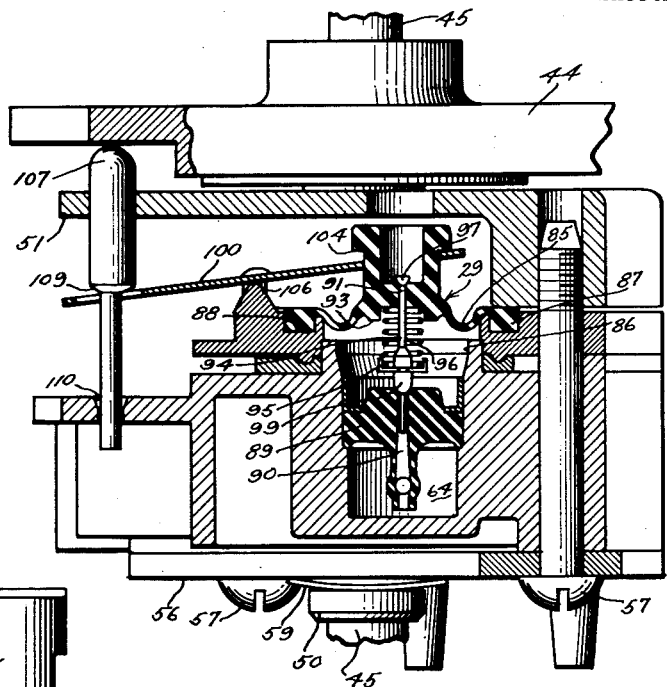
FIGURE 6 is a fragmentary sectional view taken substantially along line VI—VI of FIGURE 3 and illustrating one of the vacuum regulator valves.

The diaphragm 85 has a central thickened generally cylindrical portion having a port 91 leading therethrough, concentric with the center thereof and having an inner inwardly extending inner wall 93 spaced outwardly of the port 91, the inner margins of which, with the undersurface of the diaphragm 85, form a seat for a spring 94. The spring 94 is seated at its opposite end on a seating member 95 mounted on a stem 96 for a valve 97 and biasing the valve 97 into engagement with the outer end of the port 91 and thereby sealing said port from the passage of air at atmospheric pressure into the vacuum control chamber 86. The spring 96 also biases a valve 99 at the opposite end of the stem 96 from the valve 97 into engagement with the end of the passageway 90 leading through the check valve 89, when the diaphragm 85 is in its retracted position shown in FIGURE 6.

Figure 7:
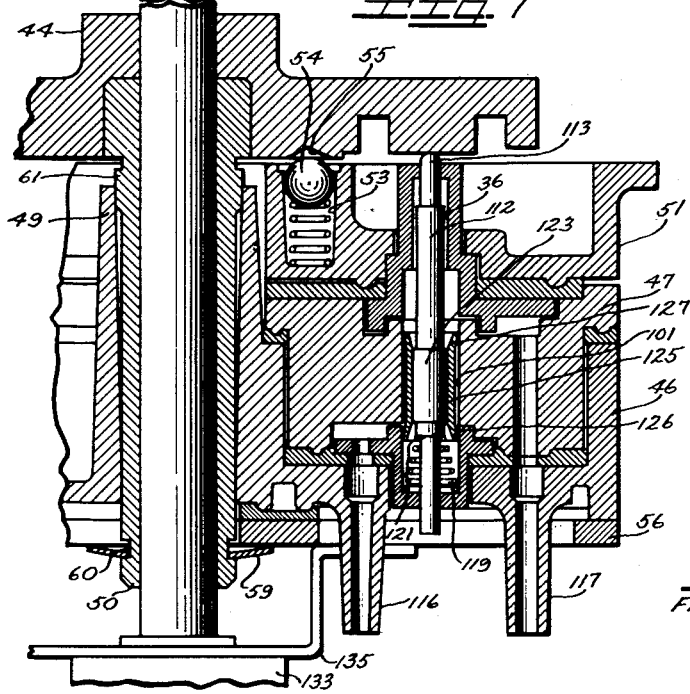
FIGURE 7 is a fragmentary sectional view taken substantially along line VII—VII of FIGURE 3 and illustrating one of the diverter valves.

A yieldable lever 100 is provided to lift the valve 99 off of its seat and open the passageway 90 to the vacuum control chamber 86, to draw air therefrom and to draw air from a vacuum chamber 101 for the diverter valve 31, through a passageway 103 (see FIGURES 3 and 7). The yieldable lever 100 may be made from spring steel or a like material and encircles the central thickened portion of the diaphragm valve 85 and abuts the underside of a collar 104, formed integrally with said central thickened portion and is fulcrummed intermediate its ends on a fulcrum 106. The opposite end of the lever 100 is engaged by a slidable follower pin 107 underneath a shoulder 109 on said follower pin. The follower pin 107 is slidably guided in the upper body part 51 at its upper end and in an aperture 110 formed in the lower body part 46, at its lower end, beneath the shoulder 109. The follower 107 is adapted to be engaged by a cam 111 mounted on the undersurface of the cam disk 44 and shown in profile in FIGURE 9.

As the high part of the cam 111 depresses the follower pin 107, the diaphragm 85 will be raised to move the valve 99 off its seat and to connect the vacuum input 63 with the vacuum control chamber 86. If, however, the vacuum in the vacuum control chamber 86 should rise above a predetermined desired value, the vacuum in said chamber will move the diaphragm 85 inwardly against the spring lever 100 and first close the valve 99 and then open the valve 97 and accommodate air at atmospheric pressure to flow into the vacuum chamber 86 until the vacuum within said chamber is balanced, in accordance with the position of the follower pin 107 along the cam face 111 and the tension of the spring 100, at which time the valve 97 will then close. The valve 99 will then open upon a further decrease in vacuum in the vacuum control chamber 86. The vacuum in the vacuum control chamber 86 is thus regulated by the position of the follower 107 along the face of the cam 111 and the tension of the spring lever 100.

The diverter valve 31 is shown as including a valve stem 112 slidably mounted in the valve body portions 46, 47 and 51 and having an upper follower end portion 113 biased into engagement with a cam 115, moving the diverter valve into position to connect either a vacuum output 116 or a vacuum output 117 with the vacuum chamber 101 and the vacuum control chamber 86 of the vacuum regulator valve 35.

The follower end portion 113 is biased into engagement with the face of the cam 15 by a spring 119 seated in a retainer and seal 120 mounted in the lower body part 46. Spring 119 is shown as engaging a downwardly facing shouldered portion 121 of an enlarged diameter portion 123 of the stem 112.

The valve means for the diverter valve 31 includes a flexible sleeve 125 mounted on the enlarged diameter portion 123 and extending beyond opposite ends of said enlarged diameter portion and having outwardly flared end portions 126 and 127 having wiping engagement with the wall of a vacuum chamber 101. When the stem 113 is in its depressed position shown in FIGURE 7 the vacuum output 116 is connected with the vacuum chamber 101 and vacuum control chamber 86 of the modulator valve 29 to effect operation of the vacuum motor 17, regulating the temperature of operation of the vacuum control valve for the heater core 16, and thereby regulating the flow of hot water through the heater coil.

When the cam disk 44 is turned to engage the follower end portion 113 of the stem 12 with the lower part of the cam 115 the spring 119 will move the valve 106 upwardly along the valve chamber 101 in position to close the passage of vacuum to the vacuum output 116 and accommodate the flow of vacuum in through the vacuum output 117 and thereby supply vacuum to operate the vacuum motor 19 and effect operation of the air conditioner.

In a like manner, the vacuum modulating valve 35 is operated by a follower 128 engaging a cam 129 on the undersurface of the cam disk 44 while the diverter valve 36 is operated by a follower 130 engaging a cam 131 on the undersurface of the cam disk 44. A passageway 132 connects the diverter valve 36 with the vacuum modulator valve 35. In the present instance the diverter valve 36 has a vacuum output 134 connected with the vacuum motor 23, for operating the defroster damper 21. A second vacuum output 134a is blocked off, although this may be opened where it may be desired to effect another operation by vacuum.

It should be noted from FIGURE 3 that the follower 107 controlling operation of the regulator valve 29 is adjacent the outside of the cam disk 44 while the follower 128 controlling operation of the regulator valve 35 is spaced inwardly of the follower 107. The follower 113 operating the diverter valve 31 is likewise spaced radially inwardly of the followers 107 and 128, and the follower 130 operating the diverter valve 36 is spaced inwardly of the follower 113, while the follower 78 operating the on-off valve 39 is the innermost follower. The respective cams 111, 129, 131, 115 and 79 are also so arranged that upon turning movement of the cam disk 44 the various valves may be operated independently and simultaneously of each other.

The shaft 45 is slidably mounted in the sleeve 50 and hub of the cam disk 44 and has connection with a switch 133 mounted on a bracket 135 secured to the bottom of plate 56 and spacing the switch 133 beneath the bottom of said plate. The switch 133 may be of any well known form so need not herein be shown or described in detail and diagrammatically shown in FIGURE 1 as having a movable switch arm 136 engageable with any one of three contacts 137, 138 or 139. When the shaft 45 is in its depressed position the movable switch arm 133 will be in engagement with the contact 137 and the motor 14 will be deenergized. As the shaft 45 is moved outwardly the switch arm 136 will then come into engagement with the contact 138 to energize the motor 14 through a resistor 140 to effect operation of the motor 14 at half speed. As the shaft 45 is moved to its extreme outermost position the movable switch arm 136 will come into engagement with the contact 139 to effect operation of the motor 14 and the blower 13 at full speed.

Thus, the same knob which controls operation of the heater, the air conditioner and the defroster also controls the speed of operation of the blower motor 13 by merely pulling outwardly on or depressing the knob 42.

It should here be understood that while I have described the control device and system of my invention as controlling the operation of a heater and air conditioner for an automotive vehicle, that it may also control the operation of the heater alone and the ventilating dampers, as in my companion application Serial No. 703,355.

While I have herein shown and described one form in which my invention may be embodied, it will be understood that various modifications and variations in the invention may be effected without departing from the spirit and scope of the novel concepts thereof as defined by the claims appended hereto.

I claim as my invention:

1. A vacuum control device comprising a valve body having first and second vacuum chambers therein connected together in series, a vacuum input leading from a first of said vacuum chambers, a vacuum output leading from a second of said vacuum chambers, a vacuum regulator valve in the first of said vacuum chambers providing a preselected vacuum in the second of said vacuum chambers, said vacuum regulator valve including valve means controlling the flow of vacuum from the first of said vacuum chambers, and regulating the vacuum in the second of said vacuum chambers, and a diaphragm extending across the first of said vacuum chambers for opening said valve means upon extensible movement of said diaphragm with respect to said chamber, yieldable means having operative connection with said diaphragm for extensibly moving said diaphragm with respect to said chamber and accommodating retractable movement of said diaphragm by the vacuum in said chamber, to close said valve means, a diverter valve in the second of said vacuum chambers operable in one position to connect said vacuum output with the first of said vacuum chambers, and operating means for said valves including means for varying the tension of said yieldable means and other means for operating said diverter valve independently of the varying of the tension of said yieldable means.

2. A vacuum control device comprising a valve body having first and second vacuum chambers therein connected together in series, a vacuum input leading from a first of said vacuum chambers, a vacuum output leading into a second of said vacuum chambers, a vacuum regulator valve in the first of said vacuum chambers providing a preselected vacuum in the second of said vacuum chambers, said vacuum regulator valve including valve means controlling the flow of vacuum from the first of said vacuum chambers and a diaphragm extending across the first of said vacuum chambers for opening said valve means upon extensible movement of said diaphragm with respect to said chamber, a yieldable member having operative connection with said diaphragm for extensibly moving said diaphragm with respect to said chamber and accommodating retractible movement of said diaphragm by the vacuum in said chamber, to close said valve means, a diverter valve in the second of said chambers operable in one position to connect said vacuum output with the first of said vacuum chambers, a rotatable cam plate, cam means on said cam plate having operative connection with said yieldable member for varying the tension thereof and the extension of said diaphragm from the first of said chambers, and other cam means on said cam plate for operating said diverter valve independently of operation of said yieldable member.

3. A vacuum control device comprising a valve body having first and second vacuum chambers therein connected together in series, a vacuum input leading from a first of said vacuum chambers, a plurality of vacuum outputs leading to a second of said vacuum chambers, a vacuum regulator valve in the first of said valve chambers providing a preselected vacuum in the second of said vacuum chambers, said vacuum regulator valve including valve means controlling the flow of vacuum from the first of said vacuum chambers and a diaphragm extending across the first of said valve chambers and valve means operated thereby upon extensible movement of said diaphragm for connecting said vacuum chamber with said vacuum input, a yieldable member having operative connection with said diaphragm for extensibly moving said diaphragm with respect to said chamber to open said valve means and for accommodating retractible movement of said diaphragm by the vacuum in said chamber to close said valve means and to vent said chamber to atmosphere, a diverter valve in the second of said chambers operable in one position to connect one vacuum output with the first of said vacuum chambers and in another position to connect the other vacuum output with the first of said vacuum chambers, a rotatable cam plate, cam means on said cam plate having operative connection with said yieldable member for varying the tension thereof and the extension of said diaphragm with respect to the first of said chambers, and other cam means on said cam plate for operating said diverter valve independently of operation of said yieldable member.

4. A vacuum control device comprising a valve body having first and second valve chambers therein connected together in series, a vacuum input leading from a first of said vacuum chambers, a vacuum output leading into a second of said valve chambers, a vacuum regulator valve in the first of said valve chambers providing a preselected vacuum in the second of said vacuum chambers and including a diaphragm extending across the first of said valve chambers, valve means operated thereby upon extensible movement of said diaphragm with respect to said chamber to connect said chamber with said vacuum input and operable by retractible movement of said diaphragm to close said chamber to said vacuum input and to vent said chamber to atmosphere, a spring lever fulcrumed intermediate its ends and having operative connection with said diaphragm at one of its ends for extensibly moving said diaphragm with respect to said chamber and accommodating retractible movement of said diaphragm by the vacuum in said chamber, a diverter valve in the second of said chambers operable in one position to connect said vacuum output with the first of said vacuum chambers, a follower pin operatively connected with said spring lever on the opposite side of the fulcrum thereof from said diaphragm for operating said spring lever to extensibly move said diaphragm, a second follower pin for operating said diverter valve, said follower pins being spaced radially with respect to each other, a rotatable cam plate, cam means on said cam plate having operative connection with said first mentioned follower pin for operating said spring lever and varying the tension thereof, and other cam means on said cam plate engageable with said second follower lever for operating said diverter valve independently of operation of said spring lever.

5. In a vacuum control system, a source of vacuum, a series of individual vacuum motors for controlling certain operations, control means for said vacuum motors connecting said vacuum motors with said source of vacuum comprising an "on" and "off" valve connecting one of said vacuum motors of said series of vacuum motors with a source of vacuum, other valve means providing a preselected vacuum for operating a second of said series of individual vacuum motors comprising a vacuum regulator valve and a diverter valve connected in series therewith, a single control knob, and cam means operated by rotation of said knob for operating said "on" and "off" valve, said vacuum regulator valve and said diverter valve independently or simultaneously of each other.

6. In a vacuum control system, a source of vacuum, a series of vacuum motors for carrying out certain operations, a plurality of vacuum regulator valves connected with said source of vacuum and regulating the vacuum input to said vacuum motors, a diverter valve connected with each vacuum regulator valve, in series therewith, each diverter valve having connection with an individual vacuum motor and controlling the input of vacuum to said vacuum motor, and a single knob having cam means thereon for independently operating said vacuum regulator valves to vary the vacuum output of said valves, and for operating said diverter valves independently of each other.

7. In a vacuum control device, a source of vacuum, a valve body having a plurality of valve chambers therein adapted to be connected to said source of vacuum and to a plurality of vacuum motors, each vacuum motor being adapted to operate a device to be operated, vacuum control means in said valve chambers connected with said source of vacuum and said valve means for controlling the degree of vacuum to be applied to said vacuum motors, adjustable means associated with said vacuum control means for singly and simultaneously selectively operating said vacuum motors and adjusting said control means to select the degree of vacuum applied to the operated vacuum motors and the degree of operation of the respective devices operated thereby.

8. In a vacuum control device a source of vacuum, a series of vacuum motors adapted to operate a series of devices to be operated, a valve body having a plurality of valve chambers therein adapted to be connected to said source of vacuum and to said vacuum motors for effecting operation of certain selected devices to be operated, vacuum control means in certain of said valve chambers for controlling the degree of vacuum to be applied to selected of said vacuum motors, valve means in certain other of said valve chambers controlling the application of vacuum to the selected vacuum motors, and adjustable means associated with said vacuum control means and said valve means for singly and simultaneously selectively operating said vacuum motors and adjusting said vacuum control means to select the degree of vacuum applied to the selected vacuum motors operated thereby, and the degree of operation of the respective devices to be operated.

References Cited in the file of this patent

UNITED STATES PATENTS

| 2,308,583 | Berges | Jan. 19, 1943 |
| 2,334,031 | Rappl | Nov. 9, 1943 |

(Other references on following page)

UNITED STATES PATENTS

| | | |
|---|---|---|
| 2,335,525 | Matter | Nov. 30, 1943 |
| 2,377,115 | Van Der Werff | May 29, 1945 |
| 2,523,521 | Ritter | Sept. 26, 1950 |
| 2,674,853 | Born | Apr. 13, 1954 |
| 2,811,171 | Willis et al. | Oct. 29, 1957 |
| 2,828,612 | O'Shei | Apr. 1, 1958 |
| 2,845,939 | Bayer | Aug. 5, 1958 |
| 2,906,098 | Mayo | Sept. 29, 1959 |